United States Patent [19]

Weggeland

[11] 4,057,920
[45] Nov. 15, 1977

[54] PICTURE VIEWER WITH SUCCESSIVE FEED MEANS

[76] Inventor: John H. Weggeland, 202 Bougenvillea, Lehigh Acres, Fla. 33936

[21] Appl. No.: 634,919

[22] Filed: Nov. 24, 1975

[51] Int. Cl.² .............................................. G09F 11/30
[52] U.S. Cl. ......................................... 40/79; 40/65
[58] Field of Search ................ 40/64 A, 65, 65 A, 78, 40/78.07, 79, 78.03

[56] References Cited

U.S. PATENT DOCUMENTS

| 3,293,780 | 12/1966 | Cook et al. | 40/65 X |
| 3,377,727 | 4/1968 | Weggeland | 40/78.07 |
| 3,633,803 | 1/1972 | Kourganoff | 40/78 |
| 3,783,540 | 1/1974 | Barclay | 40/64 A |
| 3,805,970 | 4/1974 | Eash | 40/79 X |

Primary Examiner—Louis G. Mancene
Assistant Examiner—Wenceslao J. Contreras

[57] ABSTRACT

A picture viewer that comprises a generally flat housing for a stack of pictures or similar rectangular items and includes a manually reciprocative shuttle upon which such a stack is stored, said shuttle having a rear edge portion for engaging the rear edge of the lowermost items on the shuttle, whereby, upon protractive movement of the shuttle, the item engaged therewith is withdrawn from the bottom of the stack to be totally therebeyond, said shuttle being provided with means to resiliently upwardly bias said removed item to a position above the level of the top of the stack, and said item, during retractive movement of the shuttle to its retracted position, moves said item between the top of the stack and the top wall of the housing to be in register with a viewing opening in said top wall.

7 Claims, 13 Drawing Figures

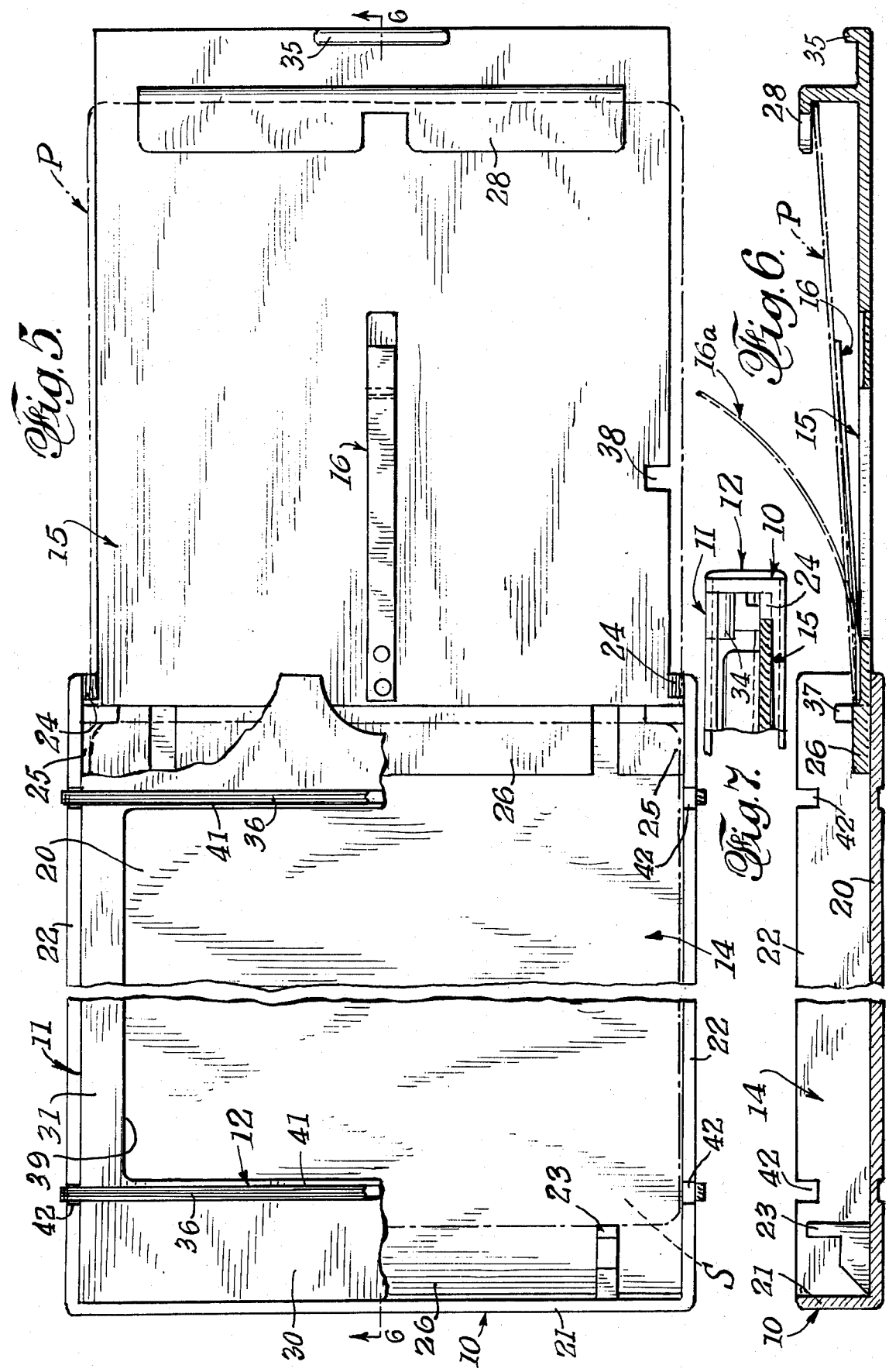

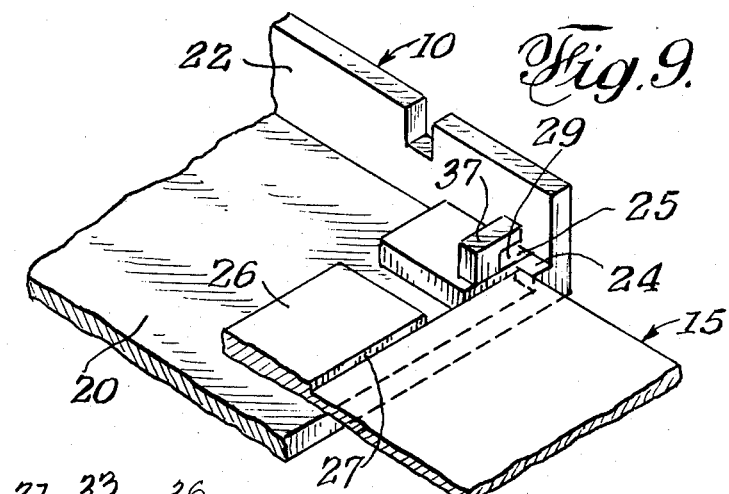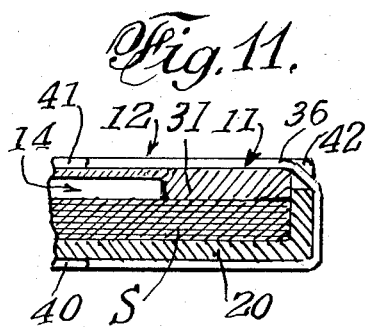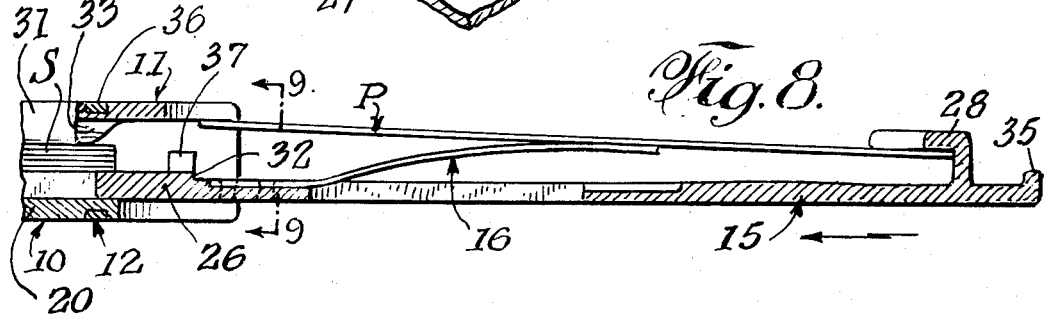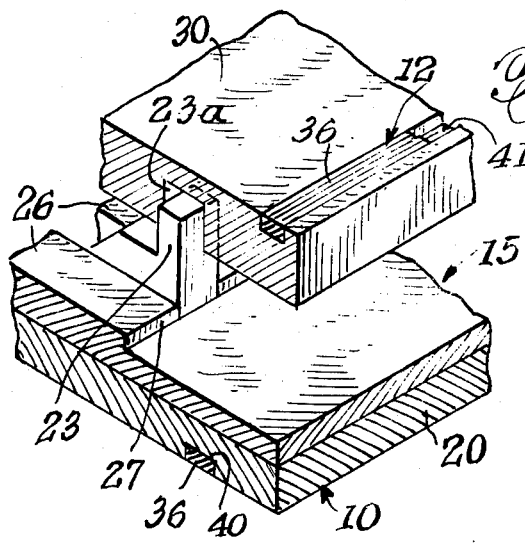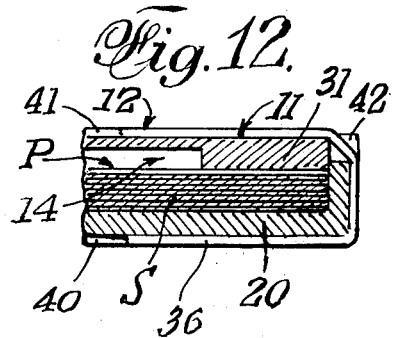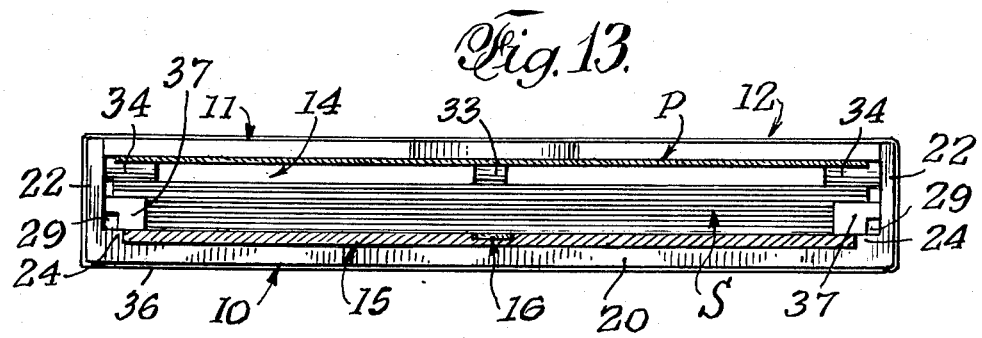

PICTURE VIEWER WITH SUCCESSIVE FEED MEANS

BACKGROUND OF THE INVENTION

1. Field of the Invention

The provision of a flat, pocket-size device as herein characterized, the same not only being inexpensive and simple of operation, is adapted to be carried in the pocket or stored in the case designed for accommodating the user's camera.

2. Description of the Prior Art

Many viewers remove pictures from the bottom of the stack, the same eventually being positioned in a stack separate from the first stack. Other viewers remove the top pictures of a stack of pictures, the same requiring spring means that exert a bias against the bottom of the stack. Such spring means requiring a bias capable of lifting the stack so the shuttle can move the picture that had been displaced to the bottom of the stack. Such spring means, because of the weight of the stack, are space-consuming in comparison to spring means that require imposing a bias sufficient only to raise a single picture from the level from which it was removed to the level to which it is lifted for being shifted to a position between the stack and the top of the viewer.

SUMMARY OF THE INVENTION

The present picture viewer is particularly characterized by having a shuttle which, when retracted from the viewer housing conveys the picture that is withdrawn from the bottom of the stack of pictures and, while so conveying it, lifting said picture under a light bias from a spring carried by the shuttle so that, when the picture is finally withdrawn from the stack, its rearward end is free of the stack and is biased into contact with the undersurface of the top wall of the viewer. The picture is thus positioned so that upon retraction of the shuttle into the housing, said rearward end of the picture is introduced between the top of the stack and the undersurface of the top of the housing of the viewer so it is exposed to view through the opening in said housing top.

It is an object of the invention, as above characterized, to provide a picture viewer that can be manually operated and which keeps the shuttle thereof from becoming detached, thereby enabling successive pictures of a stack thereof or of comparable items to be successively rapidly viewed.

Another object of the invention is to provide a picture viewer that retains the stack in its proper position and keeps the pictures of a stack from being displaced therefrom during operation.

Still another object of the invention is to so control and guide the picture being removed from the bottom of the stack and returned to the top of the stack whereby the viewer may be held in any position while being operated and yet retain the pictures against displacement from the viewer.

Said invention also comprises novel details of construction and novel combinations and arrangements of parts, which will more fully appear in the course of the following description which is based on the accompanying drawings. However, said drawings merely show and the description merely describes the invention with respect to a preferred embodiment, the same being given by way of illustration or example only.

In the drawings, like reference characters designate similar parts in the several views:

BRIEF DESCRIPTION OF THE DRAWINGS

FIG. 5 is a broken top plan view of said picture viewer with its shuttle extended.

FIG. 6 is a longitudinal sectional view as taken on the line 6—6 of FIG. 5.

FIG. 7 is a fragmentary end view of the viewer as seen in the direction of the arrows of line 7—7 of FIG. 1.

FIG. 8 is a partial longitudinal sectional view taken on line 6—6 of FIG. 5 showing the shuttle extended as in FIG. 6, the picture mounted on said shuttle being in its position preparatory to being returned to the top of the stack of pictures from the bottom of which said picture had been removed.

FIG. 9 is an enlarged fragmentary perspective view as seen in the direction of the arrows of line 9—9 of FIG. 8.

FIG. 10 is a similarly enlarged fragmentary perspective view as seen in the direction of the arrows of line 10—10 of FIG. 1.

FIG. 11 is an enlarged fragmentary sectional view as taken on the line 11—11 of FIG. 1 showing typical elastic means holding the cover plate in resilient contact with a stack of pictures disposed in a base housing in which the cover plate is slidingly fitted.

FIG. 12 is a view similar to FIG. 11 illustrating the expansion of the elastic means when a picture that had been removed from the bottom of the stack is returned to the top of the stack.

FIG. 13 is a transversed sectional view taken on the line 9—9 of FIG. 8.

DESCRIPTION OF THE PREFERRED EMBODIMENT

Figure 1:
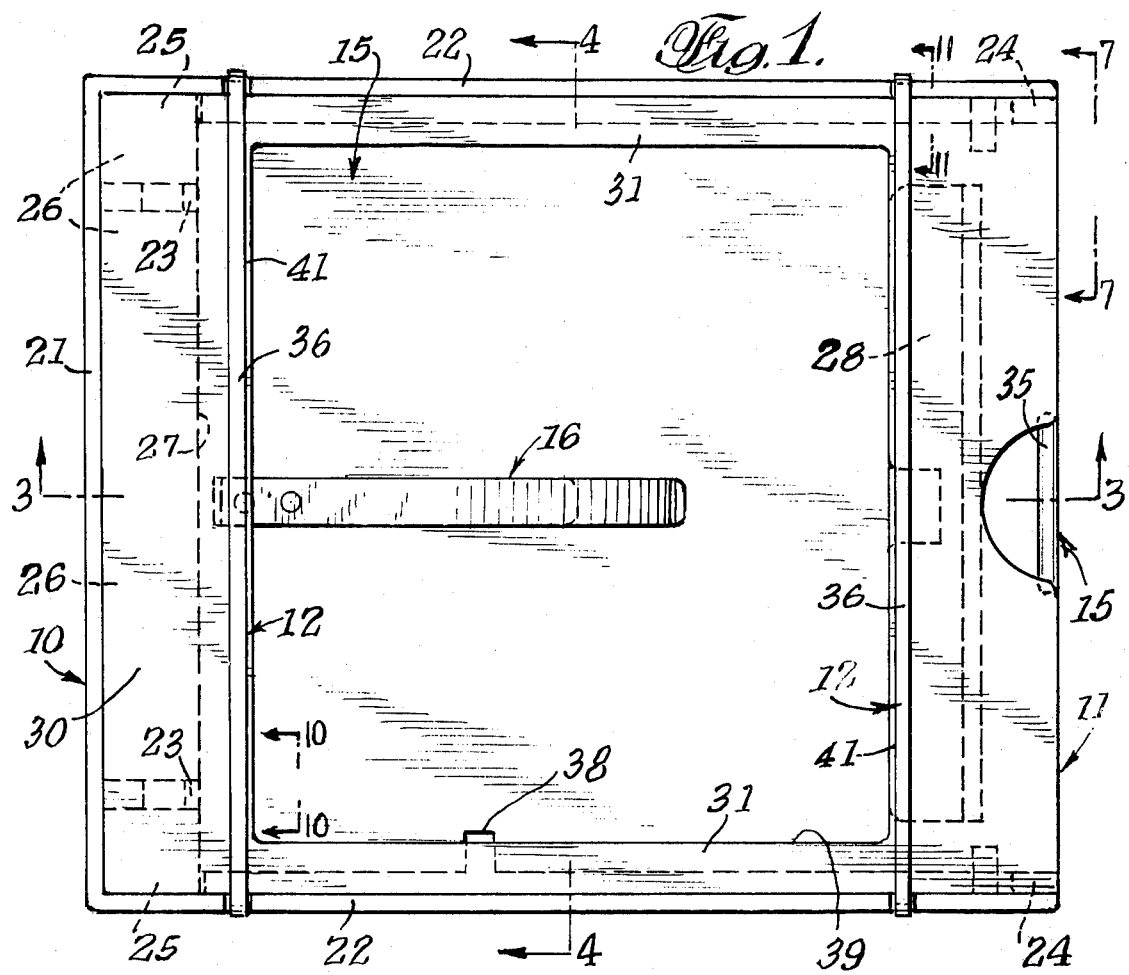
FIG. 1 is a top plan view of the present picture viewer shown in normally unoperated condition.

The present picture viewer comprises, generally, a rectangular base housing 10, a top cover plate 11 for said housing, elastic means 12 movably connecting said base and cover plate to enclose a chamber 14, a shuttle 15 manually slidable in and out of one end of said chamber, and a flexible tongue 16 affixed to the upper face of said shuttle for upwardly biasing the lowermost picture P that had been shifted from a stack of pictures S disposed in chamber 14 upon the shuttle 15.

The housing 10, the cover plate 11, and the shuttle 15 are preferably but not necessarily formed of a high impact synthetic plastic.

The housing 10 has a flat bottom 20, an upright wall 21 at one end of the housing, and opposite side walls 22. The end of the housing, opposite the wall 21, is open, as shown in FIGS. 3, 5 and 6.

Figure 3:
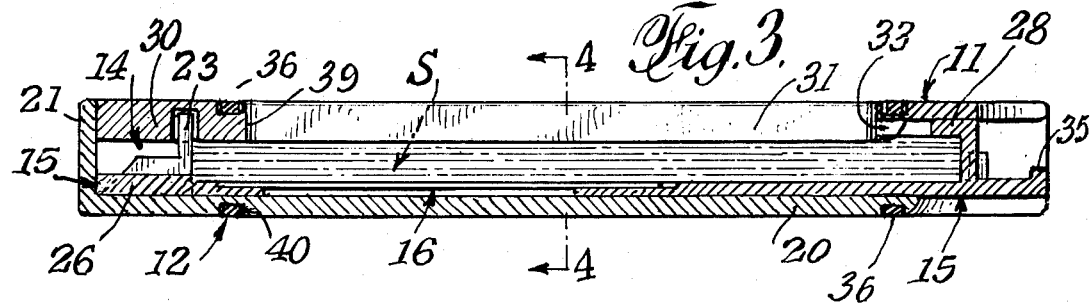
FIG. 3 is a longitudinal sectional view as taken on the line 3—3 of FIG. 1.

Extending upwardly from the surface of said bottom 20 are provided stack locaters 23, the same serving to engage the edge of the pictures of the stack S that are adjacent the housing wall 21 to retain said pictures in stacked alignment, as seen in FIG. 3.

Adjacent the open end of the housing 10 and extending from the upper face of the bottom 20 and the inner faces of the side walls 22, are provided shuttle stops 24 that engage oppositely directed lateral extensions 25 on the end 26 of the shuttle 15, thereby limiting the extended position of the shuttle 15 to that shown in FIGS. 5, 6 and 8. Said end 26 is thicker than the remainder of the shuttle as shown in FIGS. 3, 7 and 8, the increased thickness being only great enough to provide a ledge 27 that engages the rearward end of the lowermost picture of the stack S, but not any portion of the picture thereabove, to insure that, upon extension of the shuttle from its retracted position of FIGS. 1 and 3, to the extended position of FIGS. 5, 6 and 8, only the lowermost picture of the stack S will be shifted from the bottom of the stack, as shown on the left of FIG. 5, to a position on the right upon the extended shuttle 15. As shown in FIG. 6 at 16a, tongue 16 is provided with an upwardly biased flexure which is flattened, as shown in FIGS. 3 and 4 when the shuttle 15 is in retracted position beneath the stack S.

Upon extension of the shuttle, the forward end of the lowermost picture of said stack will be biased upwardly by said tongue, as shown in FIG. 6, to engage the underside of a rearwardly directed raised lip 28 on the shuttle. Since the tongue 16 exerts a light bias on the forward end of the picture on the shuttle, said end will be lightly pressed against the undersurface of said lip. During this movement of the shuttle, the picture P that is being carried thereby has its side edge portions 25 pass through a throat 29 adjacent each of the inner faces of the walls 22 of the housing 10. Said throats 29 enable the lateral shuttle extensions 25 to reach and engage the stops 24 at which point the trailing edge of the picture being carried by the shuttle is clear of the stack S, at which time the tongue 16 will press lightly on the underface of the middle portion of the picture P to bring the trailing portion thereof into light pressing engagement with the forward undersurface of the cover plate 11, i.e. between the top of the stack S and the undersurface of the cover plate 11.

Figure 4:
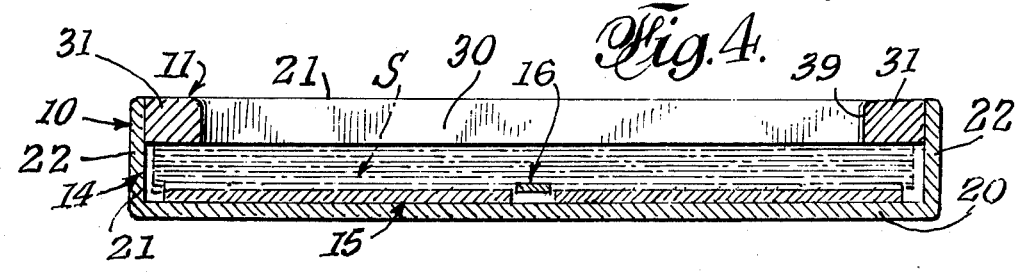
FIG. 4 is a transverse sectional view as taken on the lines 4—4 of FIGS. 1 and 3.

As shown in FIGS. 3 and 4, the cover plate 11 has its rear portion 30 and its side portions 31 thickened so as to combine with the top surface of the shuttle to retain the stack S in non-shifting position even when the picture on the bottom of the stack is engaged by the raised edge 27 of the shuttle to effect shifting of the lowermost picture of the stack to the position shown in FIGS. 6 and 8.

It will be clear from the foregoing that the picture P, thus displaced from the stack, is in an elevated position above the top surface of the shuttle so that upon return of the shuttle to its initial position, as shown in FIGS. 8 and 13 said picture P is guided by a lead-in projection 33 on the underside of the cover plate 11 and similar transversely aligned curved ends 34 on side portions 31 of the cover plate 11 to move over the top picture of the stack to cover the same. In this manner, successive protractive and retractive movements of the shuttle cause the pictures that are successively moved from the bottom of the stack S to be exposed for viewing through opening 39 in the cover plate 11 of the viewer. It will be clear that the pictures are moved from the bottom to the top of the stack, the elastic pressure by the means 12 providing the bias that retains the stack in position during protractive and retractive movements of the shuttle.

As shown in FIGS. 8 and 13, after the ledge 27 of the shuttle 15 had withdrawn the bottom picture P of the stack, by holding the housing in one hand and pulling outwardly on the rib 35 of the shuttle with the other, the spring tongue 16, from its flattened condition as pressed by the elastic means 12, seeks to assume its normally upwardly directed position 16a of FIG. 6. When the tongue encounters the picture P on the withdrawn shuttle, it will lift said picture so its forward end will encounter the underface of the lip 28 and its rearward end will encounter the underface of the cover plate 11. This position of the picture P is shown in FIG. 8, which figure also shows how said tongue flattens from its initially upwardly curved form of FIG. 6.

The above-described pressure created by the elastic means 12 is maintained on the stack S during the return movement of the shuttle so the end of the picture P that is engaged with the undersurface of the cover plate 11 can smoothly move along the latters undersurface and the lead-in surfaces of projection 33 and 34 on the side portions 31 of the cover plate 11. Thus, as the shuttle is continued to its fully retracted position, as in FIG. 3, the picture P smoothly slides over the stack S into viewing position through the opening 39 in the top of the cover plate 11.

As shown in FIGS. 8 and 13, to avoid having to transversely flex and perhaps damage the shuttle while moving it to a similar position in the other longitudinal edge of the shuttle, the same is provided with a notch 38 located between the lateral extension 25 on said latter edge and the end of the shuttle. In this manner, after the first-mentioned shuttle edge is engaged under the throat member 37 on one side, the shuttle can be moved rearwardly until the notch 38 is aligned with the second-mentioned throat member. Upon dropping the notched edge over the second-mentioned throat member, the shuttle is free to be moved back and forth to successively shift pictures from the bottom of the stack S to the top thereof.

Figure 2:
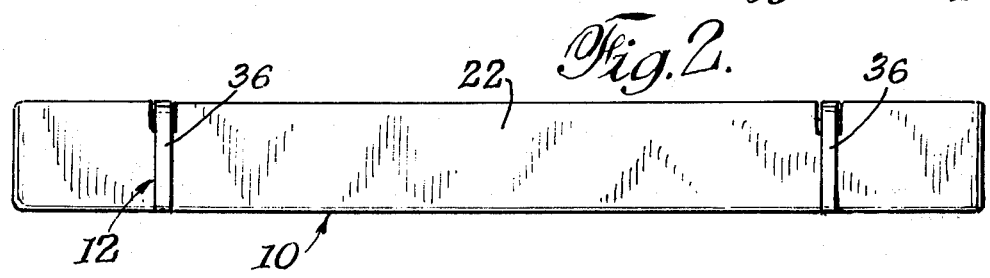
FIG. 2 is a side view thereof.

In order to obtain the afore-described pressure of the cover plate 11 on the stack S during the removal of the item P from the bottom of the stack and to allow said plate 11 to be upwardly displaced by said item while the latter is being returned to the top of the stack, as hereinbefore explained, the means 12 comprises two elastic bands 36 that encircle the base housing 10 and the top cover plate 11. Said means 12 is best located on the housing by having them encircle each end of the viewer, as shown in FIGS. 1, 2 and 3.

Said bands 36 of the means 12 are retained in position by transverse grooves 40 in the outer surface of the housing bottom 20 and similar grooves 41 in the outer surface of the cover plate 11. It will be noted that the grooves 40 and 41 have a depth approximating the thickness of the bands 36 so said bands are retained against lateral shifting relative to the housing and cover plate.

FIGS. 11 and 12 show that the side walls 22, at their upper ends, are provided with notches 42 into which the bands 36 fit to insure against lateral displacement of the base housing and the cover plate.

The word "picture," as used in this application, is intended to include any similarly shaped and similarly thick enlargements of photos of non-professionals as well as other similarly shaped and thick items.

While the foregoing has illustrated and described what is now contemplated to be the best mode of carrying out the invention, the construction is, of course, subject to modification without departing from the spirit and scope of the invention.

Having thus described the present invention, what is claimed and desired to obtain by Letters Patent is:

1. A picture viewer comprising:

a rectangular housing having three closed and one open side, a top and a bottom, a manually slidable shuttle normally disposed on the bottom of said housing and guided for manual movement from said position within said housing and a position extending from the mentioned open side of the housing, the rearward portion of said shuttle being provided with an abutment means for locating a stack of pictures disposed upon said shuttle, said abutment engaging the rearward edge of the lowermost picture of the stack whereby, when the shuttle is moved to its extended position, only said lowermost picture is transported by the shuttle to a position beyond the forward side of the stack, an upwardly flexed tongue provided on the top surface of the rearward end of the shuttle to upwardly raise the rear end of the picture upon the shuttle; and the forward end of the shuttle being provided with a raised rearwardly directed lip, the underface of said lip being engaged by the forward end of the picture that is upwardly raised by the tongue, and upon return movement of the shuttle, the picture thereon is moved by the mentioned lip of the shuttle to a position on the top of the stack and into register with the abutment which locates the stack.

2. A picture viewer according to claim 1 in which the housing comprises a rectangular base member having the mentioned three closed sides and the one open side, and the bottom, and the mentioned top comprises a cover for said housing, said top cover constituting a frame for the top picture of the stack, and the rear and both side portions of said top of the housing being thicker than the mentioned forward portion of the top cover, to press upon the topmost picture of the stack to guide the rearward edge of said picture when the shuttle is returned from its extended position to its initially contracted position.

3. A picture viewer according to claim 2 in which is provided a centrally located projection on the undersurface of the end of the housing between the thicker side portions of the top cover, said projection and aligned ends of the mentioned thickened portions having lead-in slanted ends to guide the pictures that are removed from the bottom of the stack to the mentioned retracted positions in register with the frame of the top cover of the housing.

4. A picture viewer according to claim 3 provided with elastic means separably connecting said base and cover plate, said elastic means extending around said base and cover plate transversely of the direction of movement of the shuttle, said elastic means stretched to press downwardly on the housing cover plate, the latter thereby exerting a bias on the stack, the degree of such bias varying with the number of pictures on the stack.

5. A picture viewer according to claim 4, the open end of the base member of the housing, inward of the opposite sides of the side walls thereof, is provided with stops, and the mentioned thickened portion of the shuttle is provided with lateral extensions to engage said stops to limit the extended position of the shuttle.

6. A picture viewer according to claim 4 in which the elastic means comprises bands of rubber, the outer portions of the base and cover plate that are engaged with said bands being recessed to retain them against lateral movement.

7. A picture viewer according to claim 6 in which the upper ends of the recessed portions in the upper portions of the sides of the bases being notched to allow said bonds to press downwardly on the cover plate to press upon the stack although the number of pictures of the stack may vary.

* * * * *